United States Patent [19]
Watanabe et al.

[11] Patent Number: 6,010,973
[45] Date of Patent: Jan. 4, 2000

[54] DIELECTRIC FORMING MATERIAL FOR USE IN PLASMA DISPLAY PANEL AND GLASS POWDER USED THEREFOR

[75] Inventors: Hiromitsu Watanabe, Moriyama; Hiroyuki Oshita, Otsu; Masahiko Ohji, Moriyama; Kazuo Hadano, Otsu, all of Japan

[73] Assignee: Nippon Electric Glass, Co., Ltd., Otsu, Japan

[21] Appl. No.: 09/123,647

[22] Filed: Jul. 28, 1998

[30] Foreign Application Priority Data

Aug. 6, 1997 [JP] Japan .................................. 9-225685
Sep. 4, 1997 [JP] Japan .................................. 9-257867

[51] Int. Cl.[7] .......................... C03C 3/072; C03C 3/074; C03C 3/067; C03C 8/04; C03C 8/10; C03C 8/16
[52] U.S. Cl. ............................. 501/20; 501/22; 501/26; 501/25; 501/76; 501/78; 501/79
[58] Field of Search ................ 501/20, 22, 26, 501/17, 14, 76, 78, 79, 75; 523/170; 524/493, 494, 847

[56] References Cited

U.S. PATENT DOCUMENTS

| | | | |
|---|---|---|---|
| 4,654,095 | 3/1987 | Steinberg | 501/20 |
| 4,849,380 | 7/1989 | Sawhill | 501/20 |
| 5,070,047 | 12/1991 | Gardner et al. | 501/20 |
| 5,114,885 | 5/1992 | Hormadaly | 501/20 |
| 5,164,342 | 11/1992 | Muralidhar et al. | 501/20 |
| 5,418,193 | 5/1995 | Tani et al. | 501/20 |
| 5,814,571 | 9/1998 | Kawakami et al. | 501/17 |

FOREIGN PATENT DOCUMENTS 9-102273   1/1995   Japan .

Primary Examiner—C. Melissa Koslow
Attorney, Agent, or Firm—Collard & Roe, PC

[57] ABSTRACT

A dielectric forming material for a plasma display panel enables to form a dielectric layer having a high dielectric strength and good transparency. The dielectric forming material is provided with a green sheet in form that comprises, as a component, glass powder having a 50% particle diameter $D_{50}$ which is not more than 2.8 μm. Preferably, the glass powder preferably may have the maximum particle diameter $D_{MAX}$ which is not more than 18 μm. Desirably, the green sheet essentially may consist by weight of 60–80% the glass powder, 0–10% ceramic powder, 5–30% thermoplastic resin, and 0–10% plasticizer.

11 Claims, 1 Drawing Sheet

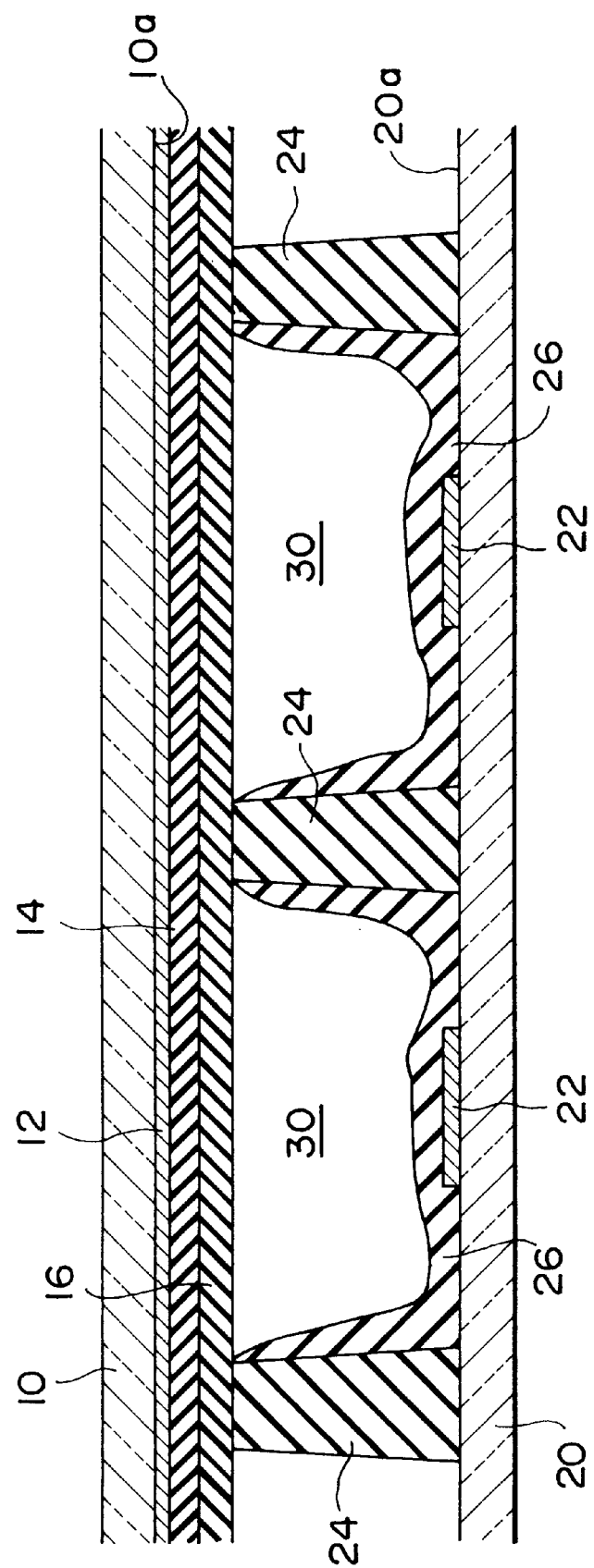
FIGURE

DIELECTRIC FORMING MATERIAL FOR USE IN PLASMA DISPLAY PANEL AND GLASS POWDER USED THEREFOR

BACKGROUND OF THE INVENTION

This invention relates to a dielectric forming material for use in a plasma display panel and a glass powder used as a main component thereof.

In general, a plasma display panel (hereinafter which will be also referred to as "PDP") comprises a pair of glass substrates on which electrodes for plasma discharge are formed. More specifically, PDPs are classified into DC type PDPs and AC type PDPs. The DC type PDP has electrodes which are exposed to a discharge space while the AC type PDP has electrodes which are coated with an insulating layer.

The AC type PDP comprises a front glass substrate and a rear glass substrate which are opposed to each other with a gap left therebetween. The front glass substrate and the rear glass substrate have first and second principal surfaces, respectively, at opposite sides. A plurality of display electrodes are formed on the first principal surface of the front glass substrate in strips. Each display electrode extends in a predetermined direction. A dielectric layer is formed on the first principal surface of the front glass substrate so as to cover the display electrodes therewith. The dielectric layer is used to maintain discharge. A protection layer is deposited on the dielectric layer by evaporation.

On the other hand, a plurality of address or data electrodes are formed on the second principal surface of the rear glass substrate in strips. Each address electrode extends in a direction which is perpendicular to the predetermined direction. A plurality of barrier ribs are formed on the second principal surface of the rear glass substrate in strips so that the barrier ribs are put between the address electrodes. In other words, two adjacent address electrodes are separated by one barrier ribs. In addition, phosphors of red (R), green (G), and blue (B) are deposited on the second principal surfaces of the rear glass substrate between the barrier ribs so as to cover the address electrodes therewith. Like in a cathode ray tube (CRT), the phosphors of three primary colors (RGB) compose one pixel.

Discharge gas is enclosed in the space between the front and the rear glass substrate with the circumference sealed tightly. The discharge gas generates a lot of ultraviolet rays on discharging.

With this structure, when a voltage is applied between a selected one of the display electrodes and a selected one of the address electrodes, gas discharge occurs at a point of intersection between the selected display electrode and the selected address electrode to generate the ultraviolet rays from the point of intersection. The ultraviolet rays excite the phosphors formed in the panel to make the phosphors emit visible light.

It is necessary for the dielectric layer to have a high dielectric strength and to have good transparency.

In prior art, such a dielectric layer is formed by a screen printing method which comprises the steps of carrying out screen-printing on a paste dielectric forming material containing glass powder and of firing the paste dielectric forming material.

However, in the screen printing method of forming the dielectric layer, marks of screen mesh remain on a surface of the dielectric layer after the screen-printing. As a result, the screen printing method is disadvantageous in that it is difficult to obtain a smooth surface of the dielectric layer, the dielectric layer has an unstable thickness, a lot of bubbles remain in the dielectric layer, and so on. In addition, the screen printing method is also disadvantageous in that it is difficult to obtain the high dielectric strength and to ensure sufficient transparency. Furthermore, in order to obtain the dielectric layer having a sufficient thickness, for example, of about 30 to 40 $\mu$m, the screen printing method must be repeatedly carried out about three to five times. Accordingly, evaporation of a solvent for use in drying process carried out each screen-printing results in easily incurring atmospheric pollution of the work environment in the screen printing method.

In order to resolve the above-mentioned problems in the screen printing method, another method of forming the dielectric layer is proposed in Japanese Unexamined Patent Publication No. Hei 9-102273, namely, JP-A 9-102273. The other forming method disclosed in JP-A 9-102273 comprises the steps of preparing a green sheet composed of dielectric material and of firing the green sheet with the green sheet attached to the front glass substrate on which the display electrodes are formed. Such a forming method is herein referred to as a green sheet method. The green sheet is made by applying paste-form composition containing glass powder, resin, and a solvent, on a support film consisting of the film of polyethylene terephtalate.

The green sheet method is advantageous in that it has an excellent workability and it is difficult to incur atmospheric pollution of the work environment. In addition, inasmuch as slurry used to sheet forming has a lower viscosity than that of paste used to the screen-printing, rolling or wrapping of bubbles is few on the sheet forming. Accordingly, it is possible to obtain the glass film which has a smooth surface and a uniform coating thickness and it is possible to form the dielectric layer having a high dielectric strength.

However, a conventional green sheet method according to JP-A 9-102273 may often obtain the dielectric layer having an insufficient transparency because a lot of microscopic bubbles remain in the dielectric layer.

SUMMARY OF THE INVENTION

It is therefore an object of the present invention to provide a dielectric forming material for use in a plasma display panel, which is capable of form a dielectric layer having a high dielectric strength and a good transparency.

Other objects of this invention will become clear as the description proceeds.

In order to clear up the cause of occurrence of a lot of microscopic bubbles in the dielectric layer, the present inventors made various experiments. As present inventor's experimental results in order to eliminate microscopic bubbles in the dielectric layer, the present inventors discovered that the above-mentioned object can be achieved by controlling a distribution of particle sizes of glass powder which is a main component of a green sheet.

The conventional green sheet method according to JP-A 9-102273 only discloses utilization of the paste-form composition containing the glass powder as a component. In other words, JP-A 9-102273 neither discloses nor teaches what particle sizes the glass powder has.

That is, a dielectric forming material for use in a plasma display panel according to this invention is characterized by the dielectric forming material being provided with a green sheet in form, the green sheet comprising, as a component, glass powder having a 50% or average particle diameter $D_{50}$ which is not more than 2.8 $\mu$m.

In addition, a glass powder according to this invention is used as a component of a dielectric forming material for use in a plasma display panel. The dielectric forming material is provided with a green sheet in form. The glass powder is characterized by having a 50% particle diameter $D_{50}$ which is not more than 2.8 μm.

BRIEF DESCRIPTION OF THE DRAWING

FIGURE is a cross-sectional view of an AC type plasma display panel to which this invention is applicable.

DETAILED DESCRIPTION OF THE INVENTION

Referring to FIG. 1, an AC type plasma display panel to which this invention is applicable will be described at first in order to facilitate an understanding of the present invention. The illustrate AC type plasma display panel is substantially equivalent to that disclosed in the above-mentioned JP-A 9-102273.

The AC type plasma display panel comprises a front glass substrate 10 and a rear glass substrate 20 which are opposed to each other with a gap left therebetween. The front glass substrate 10 and the rear glass substrate 20 have first and second principal surfaces 10a and 20a, respectively, at opposite sides. A plurality of display electrodes 12 are formed on the first principal surface 10a of the front glass substrate 10 in strips although only one display electrode is depicted in figure. Each display electrode 12 extends in a predetermined direction which is a right-and-left direction in figure. A dielectric layer 14 is formed on the first principal surface 10a of the front glass substrate 10 so as to cover the display electrodes 12 therewith. The dielectric layer 14 is used to maintain discharge. A protection layer 16 is deposited on the dielectric layer 14 by evaporation.

On the other hand, a plurality of address or data electrodes 22 are formed on the second principal surface 20a of the rear glass substrate 20 in strips. Each address electrode 22 extends in a direction which is perpendicular to the predetermined direction and which is perpendicular to a paper of figure. A plurality of barrier ribs 24 are formed on the second principal surface 20a of the rear glass substrate 20 in strips so that the barrier ribs 24 are put between the address electrodes 22. In other words, two adjacent address electrodes are separated by one barrier ribs. In addition, phosphors 26 of red (R), green (G), and blue (B) are deposited on the second principal surfaces 20a of the rear glass substrate 20 between the barrier ribs 24 so as to cover the address electrodes 22 therewith as shown in figure. Like in a cathode ray tube (CRT), the phosphors 26 of three primary colors (RGB) compose one pixel.

Discharge gas 30 is enclosed in the space between the front and the rear glass substrates 10 and 20 with the circumference sealed tightly. The space is partitioned into a plurality of partial spaces by the barrier ribs 24, as shown in figure. The discharge gas 30 generates a lot of ultraviolet rays on discharging.

With this structure, it will be assumed that one of the display electrodes 12 and one of the address electrodes 22 are selected as a selected display electrode and as a selected address electrode, respectively, and a voltage is applied between the selected display electrode and the selected address electrode. Under the circumstances, gas discharge occurs at a point of intersection between the selected display electrode and the selected address electrode to generate the ultraviolet rays from the point of intersection. The ultraviolet rays excite the phosphors 26 located at the point of intersection to make the phosphors 26 emit visible light at the point of intersection.

It is necessary for the dielectric layer to have a high dielectric strength and to have good transparency. As described above, this invention relates to a dielectric forming material for use in forming the dielectric layer having the high dielectric strength and the good transparency.

PARTICLE DIAMETERS OF GLASS POWDER

Although the glass powder according to this invention has the 50% particle diameter $D_{50}$ which is not more than 2.8 μm, the 50% particle diameter $D_{50}$ may preferably be not more than 2.5 μm and may more preferably be not more than 2.0 μm. By restricting a distribution of particle sizes in the glass powder to the above-mentioned range, spaces among particles of the glass powder are very narrow. As a result, it is possible to extremely decrease bubbles contained in a dielectric layer. Although bubbles may be still existent in the dielectric layer, the bubbles have very small. On the other hand, in a case where the glass powder has the 50% particle diameter $D_{50}$ which is more than 2.8 μm, spaces among particles are too wide, a lot of bubbles remain in the dielectric layer, and diameters of the bubbles become easily big. As a result, it is impossible for the dielectric layer to ensure a sufficient transparency. In addition, it is preferable that particle sizes of the glass powder are smaller. However, the mass production of the glass powder is apt to be difficult if the 50% particle diameter $D_{50}$ of the glass powder is less than 0.5 μm.

In addition, the glass powder may have the maximum particle diameter $D_{MAX}$ which is not more than 18 μm and which is preferably not more than 15 μm. If the maximum particle diameter $D_{MAX}$ of the glass powder is more than 18 μm, the spaces among the particles of the glass powder are apt to be wide, a lot of bubbles remain in the dielectric layer, and the bubbles have a large diameter. In addition, although it is preferable that the particle sizes of the glass powder are smaller, the mass production the glass powder is apt to be difficult if the maximum particle diameter $D_{MAX}$ of the glass powder is less than 5 μm.

COMPOSITION OF GLASS POWDER

In addition, the glass powder may be made of a glass having a composition essentially consisting by weight of 50–75% (preferably 55–70%) PbO, 2–30% (preferably 5–25%) $B_2O_3$, 2–35% (preferably 3–31%) $SiO_2$, and 0–20% (preferably 0–10%) ZnO. The glass powder also may be made of a glass having a composition essentially consisting by weight of 30–55% (preferably 40–50%) PbO, 10–40% (preferably 15–35%) $B_2O_3$, 1–15% (preferably 2–10%) $SiO_2$, 0–30% (preferably 10–30%) ZnO, and 0–30% (preferably 3–20%) BaO+CaO+$Bi_2O_3$. The glass powder further may be made of a glass having a composition essentially consisting by weight of 25–45% (preferably 30–40%) ZnO, 15–35% (preferably 20–30%) $Bi_2O_3$, 10–30% (preferably 17–25%) $B_2O_3$, 0.5–8% (preferably 3–7%) $SiO_2$, and 8–24% (preferably 10–20%) CaO+SrO+BaO. Such glass is best suited for a component of the dielectric forming material for use in the plasma display panel. This is because such glass has good flowability on firing at the firing temperature of 500–600° C. and excellent insulating property, and is stable.

DIELECTRIC FORMING MATERIAL

A dielectric forming material for use in a plasma display panel according to this invention is a green sheet which comprises, as a component, the above-mentioned glass powder. Preferably, the green sheet essentially consists by weight of 60–80% the glass powder, 0–10% ceramic powder, 5–10% thermoplastic resin, and 0–10% plasticizer. The description will be presently made as regards each component.

MIXTURE RATIO OF GLASS POWDER

The glass powder is a basic material for forming a dielectric layer having a high dielectric strength. The glass powder has a mixture ratio which is 60–80 wt % and which is preferably 65–77 wt %. If the mixture ratio of the glass powder is less than 60 wt %, bubbles occur easily on baking or firing of the green sheet. This is because the resin and the plasticizer are relatively much. It is therefore difficult to provide the dielectric layer which has the high dielectric strength and good transparency. On the other hand, if the mixture ratio of the glass powder is more than 80 wt %, workability is bad. This is because the resin and the plasticizer are relatively few and the green sheet has a weak strength.

MIXTURE RATIO OF CERAMIC POWDER

The ceramic powder is an added component for adjusting the flowability, degree of sintering, or a coefficient of thermal expansion in the dielectric forming material. The ceramic powder is added up to 10 wt % as needed and preferably the ceramic powder may be added up to 5 wt %. The ceramic powder may be alumina (aluminum oxide) powder, zirconia (zirconium dioxide) powder, silica (silicon dioxide) powder, or the like, and mixture thereof. However, it is difficult to obtain the dielectric layer having the high dielectric strength if the ceramic powder is more than 10 wt %. This is because the dielectric layer is insufficient in baking or firing. In addition, the dielectric layer has a degraded transparency if the ceramic powder is more than 10 wt %. Desirably, the ceramic powder may have a distribution of particle sizes where a 50% or average particle diameter $D_{50}$ is not more than 2.0 $\mu$m and the maximum particle diameter $D_{MAX}$ is not more than 15 $\mu$m.

MIXTURE RATIO OF THERMOPLASRIC RESIN

The thermoplastic resin is material for giving the green sheet necessary strength, necessary flexibility, and self adhesive property. The thermoplastic resin has a mixture ratio which is 5–30 wt % and which is preferably 10–25 wt %. The thermoplastic resin may be poly(butyl methacrylate) (PBMA) resin, poly(vinyl butyral) (PVB) resin, poly(methyl methacrylate) (PMMA) resin, poly(ethyl methacrylate) (PEMA) resin, ethyl cellulose (EC), or the like, and mixture thereof. If the mixture ratio of the thermoplastic resin is less than 5 wt %, it is impossible to obtain the above-mention effects. If the mixture ratio of the thermoplastic resin is more than 30 wt %, bubbles occur easily on baking or firing of the green sheet.

MIXTURE RATIO OF PLASTICIZER

The plasticizer is an additive for giving the green sheet high flexibility and self adhesive property. In other words, the plasticizer is also called flexibilizer for softening the green sheet. The plasticizer has a mixture ratio which is 0–10 wt % and which is preferably 0.1–7 wt %. The plasticizer may be buthyl benzyl phthalate (BBP), dioctyl phthalate (DOP), diisooctyl phthalate (DIOP), dicapryl phthalate (DCP), dibutyl phthalate (DBP), or the like, and mixture thereof. If the mixture ratio of the plasticizer is more than 10 wt %, the green sheet has a degraded strength and a sticky surface which results in degradation of workability.

TRANSMITTANCE & SURFACE ROUGHNESS OF A GLASS FILM

In addition, the material according to this invention may preferable be baked or fired at the firing temperature higher than glass softening temperature by 10° C. to form a glass film which has transmittance at a wavelength of 620 nm measured using integrating sphere that is not less than 85% at a coating thickness of 30 $\mu$m and which has surface roughness Ra which is not more than 0.2 $\mu$m. This reason is as follows. If the glass film formed by the above-mentioned conditions has the transmittance which is less than 85%, it is difficult to obtain the dielectric layer having sufficient transparency. In addition, it is difficult to form the dielectric layer having the high dielectric strength if the glass film has the surface roughness Ra which is more than 0.2 $\mu$m.

METHOD OF MAKING A DIELECTIC FORMING MATERIAL

The description will proceed to a method of making a dielectric forming material for a plasma display panel according to this invention.

At first, the glass powder and the thermoplastic resin are mixed to obtain a mixture thereof. In addition, the ceramic powder and the plasticizer are added or doped to the mixture as needed. Subsequently, the mixture is doped with a primary solvent such as toluene and with a subsidiary solvent such as isopropyl alcohol to obtain slurry. The slurry is applied, using a doctor blade method, on a support film made from, for example, polyethylen terephtalate (PET) to form a moist sheet. After drying, the moist sheet may preferably have a sheet thickness of about 20–100 $\mu$m. Thereafter, by removing the primary solvent and the subsidiary solvent from the moist sheet by drying, it is possible to obtain the dielectric forming material for the plasma display panel having a green sheet in form.

METHOD OF UTILIZING THE DIELECTRIC FORMING MATERIAL

The description will proceed to a method of utilizing the dielectric forming material according to this invention.

At first, a front glass substrate for use in the plasma display panel is prepared. The front glass substrate has a principal surface on which a plurality of display electrodes are formed in strips. The dielectric forming material according to this invention is adhered to the front glass substrate on the principal surface by thermocompression bonding so as to cover the display electrodes therewith. The thermocompression bonding may preferably be carried out under conditions of temperature of 50–200° C. and pressure of 1–5 fgf/cm². Thereafter, it is baked or fired for five to fifteen minutes in atmosphere of 500–600° C. in temperature, whereby the dielectric layer can be obtained on the principal surface of the front glass substrate.

In addition, in order to prevent scattering of light on a surface of the glass film and to obtain higher transparency, the dielectric layer may have two-layer structure consisting of first and second layers. In this event, the second layer of the dielectric layer may be formed using a green sheet or paste used in prior art. In addition, the dielectric forming material according to this invention may be used as the green sheet for the second layer of dielectric layer. In a case of this use, as the green sheet for the second layer may be selected low melting point glass which comprises glass powder having a softening point lower than of that of glass powder of the first layer and which is capable of sufficiently degassing at the firing temperature of 500–600° C.

EXAMPLES

The description will proceed to examples according to this invention in detail.

Table 1 shows compositions (samples A, B, and C) of the glass powder used in this examples,

TABLE 1

| Compositions | (wt %) | | |
|---|---|---|---|
| | Sample A | Sample B | Sample C |
| PbO | 65.0 | 45.0 | — |
| $B_2O_3$ | 10.0 | 20.0 | 20.0 |
| $SiO_2$ | 25.0 | 5.0 | 5.0 |
| ZnO | — | 20.0 | 35.0 |
| BaO | — | 10.0 | — |
| CaO | — | — | 15.0 |
| $Bi_2O_3$ | — | — | 25.0 |
| Softening point (° C.) | 560 | 520 | 570 |

Each glass powder was formed as follows. At first, glass materials were compounded so as to make oxide compositions shown in Table 1 to uniformly mix the glass materials into mixtures. Thereafter, each mixture was put into a platinum crucible and was melted for two hours at temperature of 1250° C. to form into a formation. Each formation was crushed to pieces which was classified into various groups of glass powders each of that has a distribution of particle sizes. In addition, a 50% or average particle diameter $D_{50}$ and the maximum particle diameter $D_{MAX}$ in each group were measured using the laser diffraction particle size analyzer which is named "Microtrack SPA" and which is manufactured and sold by Nikkiso Co., Ltd. in Japan.

Tables 2 through 4 collectively show practical examples (samples Nos. 1–11) according to this invention and a comparative example or a control (sample No. 12).

TABLE 2

| Sample No. | 1 | 2 | 3 | 4 |
|---|---|---|---|---|
| Glass powder | A | A | A | A |
| Content (wt %) thereof | 75 | 75 | 75 | 75 |
| 50% Particle Size $D_{50}$ (μm) | 1.0 | 1.0 | 1.5 | 1.5 |
| Max. Particle Size $D_{MAX}$ (μm) | 5 | 10 | 10 | 10 |
| Ceramic Powder | — | Alumina | — | Silica |
| Content (wt %) thereof | — | 3 | — | 3 |
| Thermoplastic Resin | PBMA | PMMA | PEMA | PEMA |
| Content (wt %) thereof | 21 | 19 | 21 | 19 |
| Plasticizer | DOP | DIOP | BBP | DOP |
| Content (wt %) thereof | 4 | 3 | 4 | 3 |
| Firing Temperature (° C.) | 570 | 570 | 570 | 570 |
| Average Thickness (μm) | 30 | 29 | 32 | 32 |
| Number of Bubbles | | | | |
| not more than 10 μm | 1 | 2 | 1 | 1 |
| more than 10 μm | 0 | 0 | 0 | 0 |
| Transmittance (%) | 90 | 87 | 68 | 87 |
| Surface Roughness Ra (μm) | 0.03 | 0.07 | 0.05 | 0.06 |

TABLE 3

| Sample No. | 5 | 6 | 7 | 8 |
|---|---|---|---|---|
| Glass powder | B | B | C | C |
| Content (wt %) thereof | 69 | 76 | 74 | 77 |
| 50% Particle Size $D_{50}$ (μm) | 1.0 | 1.5 | 0.8 | 1.5 |
| Max. Particle Size $D_{MAX}$ (μm) | 10 | 15 | 5 | 15 |
| Ceramic Powder | — | — | — | — |
| Content (wt %) thereof | — | — | — | — |
| Thermoplastic Resin | PVB | PBMA | PEMA | PBMA |
| Content (wt %) thereof | 25 | 20 | 23 | 17 |
| Plasticizer | DOP | DIOP | DBP | DOP |
| Content (wt %) thereof | 6 | 4 | 3 | 6 |
| Firing Temperature (° C.) | 530 | 530 | 580 | 580 |
| Average Thickness (μm) | 31 | 32 | 29 | 30 |
| Number of Bubbles | | | | |
| not more than 10 μm | 2 | 3 | 0 | 1 |
| more than 10 μm | 0 | 0 | 0 | 0 |
| Transmittance (%) | 91 | 89 | 92 | 87 |
| Surface Roughness Ra (μm) | 0.05 | 0.06 | 0.04 | 0.08 |

TABLE 4

| Sample No. | 9 | 10 | 11 | 12 |
|---|---|---|---|---|
| Glass powder | A | A | B | A |
| Content (wt %) thereof | 73 | 76 | 75 | 75 |
| 50% Particle Size $D_{50}$ (μm) | 2.0 | 2.4 | 2.4 | 3.2 |
| Max. Particle Size $D_{MAX}$ (μm) | 15 | 15 | 15 | 20 |
| Ceramic Powder | — | — | — | — |
| Content (wt %) thereof | — | — | — | — |
| Thermoplastic Resin | PEMA | PBMA | PBMA | PBMA |
| Content (wt %) thereof | 21 | 16 | 21 | 21 |
| Plasticizer | DOP | DBP | DOP | DOP |
| Content (wt %) thereof | 6 | 6 | 4 | 4 |
| Firing Temperature (° C.) | 570 | 570 | 530 | 570 |
| Average Thickness (μm) | 31 | 30 | 29 | 30 |
| Number of Bubbles | | | | |
| not more than 10 μm | 5 | 8 | 7 | 23 |
| more than 10 μm | 0 | 0 | 0 | 2 |
| Transmittance (%) | 87 | 86 | 86 | 79 |
| Surface Roughness Ra (μm) | 0.06 | 0.07 | 0.07 | 0.08 |

Each of the samples Nos. 1 through 12 was prepared or made in the following manner.

At first, the above-mentioned glass powder was mixed with various thermoplastic resin and prasticizer in a ratio in Tables 2 through 4 to obtain mixtures a mixture thereof. Subsequently, the mixture is doped with toluene serving as a primary solvent at 30 wt % and with isopropyl alcohol serving as a subsidiary solvent at 2 wt % to obtain slurry. In addition, in the sample Nos. 2 and 4, the ceramics powder having the 50% particle diameter $D_{50}$ of 0.1 μm and having the maximum particle diameter $D_{MAX}$ of 1.0 μm is added or doped to the mixture in a ratio in Table 2 before obtaining slurry. Using a doctor blade method, the slurry is applied on a support film made from polyethylen terephtalate (PET) to form a moist sheet so that the moist sheet has a film thickness of 30 μm after drying of the moist sheet. Thereafter, the moist sheet was dried to remove the toluene and the isopropyl alcohol from the moist sheet and to obtain a sheet shaped sample or a dielectric forming material having a thickness of 85 μm.

For each sample thus obtained, the present inventors evaluated the average thickness, a state of bubbles, the transmittance, and the surface roughness of the glass film after baking or firing. The result is shown in Tables 2 through 4.

As is obvious from Tables 2 through 4, the glass film of the samples Nos. 1–11 according to this invention had the average thickness of 29–32 μm and had microscopic bubbles (≦10 μm) which are in number equal to or less than eight per a square region of 250 μm×250 μm and no macroscopic bubble (>10 μm). In addition, the glass film of the samples Nos. 1–11 according to this invention had the transmittance which is not less than 86% at the wavelength of 620 nm and had the surface roughness Ra which is not more than 0.08 μm.

On the contrary, the glass film of the comparative example No. 12 had the average thickness and the surface roughness Ra both of which are substantially equal to those of the glass film of the examples Nos. 1–11. However, the glass film of the comparative example No. 12 had macroscopic bubbles (>10 μm) which are equal in number two and had microscopic bubbles (≦10 μm) which are in number equal to twenty-three per a square region of 250 μm×250 μm. In addition, the glass film of the comparative example No. 12 had the transmittance which is equal to 79% and which is less than those of the glass film of the examples Nos. 1–11.

From the above-mentioned facts, it is understood that it is possible to form the dielectric layer having the high dielectric strength and the good transparency using one of the dielectric forming materials such as the examples Nos. 1–11 according to this invention.

In addition, the average thickness of each glass film was measured in the following manner. At first, each sample was bonded on a glass plate by thermocompression bonding under conditions of temperature of 120° C. and pressure of 2.5 kg/cm$^2$. Thereafter, it was baked or fired for ten minutes at the firing temperature higher than the softening point for each glass to form the glass film. And then, the average thickness of each glass film was measured using a digital micrometer. The state of bubbles in each glass film was evaluated using a stereoscopic microscope by counting the number of bubbles in each glass film after baking that lie within a square region of 250 μm×250 μm. The transmittance of each glass film was calculated as transmittance T % at the wavelength of 620 nm using an integrating-sphere spectrophotometer. The surface roughness of each glass film was measured using a tracer method type surface roughness meter.

When the green sheet formed using glass powder according to this invention is baked or fired, it results in obtaining a glass film which has a smooth and uniform film thickness and in which any bubble hardly remains. Accordingly, glass powder according to this invention is suitable for glass powder for a dielectric forming material which is provided with a green sheet in form.

Inasmuch as a dielectric forming material for a plasma display panel according to this invention is transformed or converted into a glass film which has a smooth and uniform film thickness and in which any bubble hardly remains, it is possible to form a dielectric layer having a high dielectric strength and good transparency. In addition, it is possible to extremely improve workability. This is because a dielectric forming material according to this invention may be pasted on a substrate by thermocompression bonding or the like and it is unnecessary to repeatedly print and dry in the manner of a conventional paste type material. Furthermore, it is difficult for the dielectric forming material according to this invention to incur atmospheric pollution of the work environment in comparison with the conventional material. This is because a drying process for evaporating a solvent or the like may be carried out only one time on manufacturing of the green sheet.

While this invention has thus far been described in conjunction with preferred examples thereof, it will now be readily possible for those skilled in the art to put this invention into various other manners.

What is claimed is:

1. A dielectric forming material for use in a plasma display panel, said dielectric forming material, in the form of a green sheet, consisting essentially, by weight, of 60–80% glass powder, 0–10% ceramic powder, 5–30% thermoplastic resin, and 0–10% plasticizer, said glass powder having a 50% particle diameter $D_{50}$ which is not more than 2.8 μm.

2. A dielectric forming material as claimed in claim 1, wherein said glass powder has a maximum particle diameter $D_{MAX}$ which is not more than 18 μm.

3. A dielectric forming material as claimed in claim 1, wherein said glass powder consists essentially, by weight, of 50–75% PbO, 2–30% $B_2O_3$, 2–35% $SiO_2$, and 0–20% ZnO.

4. A dielectric forming material as claimed in claim 1, wherein said glass powder consists essentially, by weight, of 30–55% PbO, 10–40% $B_2O_3$, 1–15% $SiO_2$, 0–30% ZnO, and 0–30% BaO+CaO+$Bi_2O_3$.

5. A dielectric forming material as claimed in claim 1, wherein said glass powder consists essentially, by weight, of 25–45% ZnO, 15–35% $Bi_2O_3$, 10–30% $B_2O_3$, 0.5–8% $SiO_2$, and 8–24% CaO+SrO+BaO.

6. A dielectric forming material as claimed in claim 1, wherein said green sheet has a sheet thickness of 20–100 μm.

7. A dielectric forming material as claimed in claim 1, which forms a glass film having transmittance at a wavelength of 620 nm measured using integrating sphere that is not less than 85% at a coating thickness of 30 μm, when fired at a firing temperature higher than the glass softening temperature by 10° C.

8. A dielectric forming material as claimed in claim 1, which forms a glass film having surface roughness Ra which is not more than 0.2 μm, when fired at a firing temperature higher than the glass softening temperature by 10° C.

9. A glass powder used as a component of a dielectric forming material, in the form of a green sheet, for use in a plasma display panel, said glass powder having a 50% particle diameter $D_{50}$ which is not more than 2.8 μm and having a maximum particle diameter $D_{MAX}$ which is not more than 18 μm, said glass powder consisting essentially of, by weight, 50–75% PbO, 2–30% $B_2O_3$, 2–35% $SiO_2$, and 0–20% ZnO.

10. A glass powder used as a component of a dielectric forming material, in the form of a green sheet, for use in a plasma display panel, said glass powder having a 50% particle diameter $D_{50}$ which is not more than 2.8 μm and having a maximum particle diameter $D_{MAX}$ which is not more than 18 μm, said glass powder consisting essentially of, by weight, 30–55% PbO, 10–40% $B_2O_3$, 1–15% $SiO_2$, 0–30% ZnO, and 0–30% BaO+CaO+$Bi_2O_3$.

11. A glass powder used as a component of a dielectric forming material, in the form of a green sheet, for use in a plasma display panel, said glass powder having a 50% particle diameter $D_{50}$ which is not more than 2.8 μm and having a maximum particle diameter A which is not more than 18 μm, said glass powder having a composition consisting essentially of, by weight, 25–45% ZnO, 15–35% $Bi_2O_3$, 0.5–8% $SiO_2$, and 8–24% CaO+SrO+BaO.

* * * * *